United States Patent [19]

Hijiya et al.

[11] Patent Number: 4,820,950
[45] Date of Patent: Apr. 11, 1989

[54] FLUID BEARING

[75] Inventors: Toshinori Hijiya; Katumi Saitou, both of Tokyo, Japan

[73] Assignee: Copal Company Limited, Tokyo, Japan

[21] Appl. No.: 160,774

[22] Filed: Feb. 26, 1988

[30] Foreign Application Priority Data

Mar. 3, 1987 [JP] Japan .................................. 62-48298
Mar. 13, 1987 [JP] Japan ............................ 62-36741[U]

[51] Int. Cl.⁴ ................................................ F16C 39/06
[52] U.S. Cl. .................................. 310/90.5; 384/115; 384/121; 384/902
[58] Field of Search ................ 310/90.5, 156, 44, 154, 310/254, 157, 90; 384/114, 115, 107, 279, 902, 113, 121

[56] References Cited

U.S. PATENT DOCUMENTS

| 3,955,858 | 5/1976 | Pobeau | 310/90.5 |
| 4,443,043 | 4/1984 | Yamaguchi | 310/90.5 |
| 4,523,800 | 6/1985 | Yamashita | 310/90.5 |
| 4,547,081 | 10/1985 | Tanaka | 384/107 |
| 4,696,584 | 9/1987 | Tielemans | 384/107 |
| 4,734,606 | 3/1988 | Hajec | 310/90.5 |

FOREIGN PATENT DOCUMENTS

| 2802712 | 7/1978 | Fed. Rep. of Germany | 310/90.5 |
| 0018815 | 1/1982 | Japan | 384/107 |

OTHER PUBLICATIONS

"Newly Developed Air Bearings and Their Applications in Business Machines", Nihon Kikai Gakkai, Jul., 1986, pp. 58–63.
"Study on Externally Pressurized Porous Gas Bearings, 1. Static Performance of Externally Pressurized Porous Thrust Gas Bearings", M. Okano et al., Denshi Gijitsu Sogo Kenkyujo, vol. 38, No. 11, Nov., 1974, pp. 46–60.

Primary Examiner—R. Skudy
Attorney, Agent, or Firm—Finnegan, Henderson, Farabow, Garrett & Dunner

[57] ABSTRACT

A dynamic pressure-type fluid bearing usable in a polygon mirror scanner for a laser beam printer includes a sleeve having an inner peripheral surface and a bottom face, and a journal having an outer peripheral surface cooperating with the inner peripheral surface of the sleeve across a predetermined clearance, and an end face cooperating with the bottom face of the sleeve. In an embodiment, the sleeve is rotatable relative to the journal and is held by a magnetic retaining force in such a manner that a predetermined gap is formed between the bottom face of the sleeve and the end face of the journal even when the bearing is at rest. The bottom face of the sleeve includes a porous body so that the gap between the bottom face and end is communicated with the outside of the bearing.

15 Claims, 7 Drawing Sheets

FLUID BEARING

BACKGROUND OF THE INVENTION

1. Field of the Invention:

This invention relates to a dynamic pressure-type fluid bearing used in a polygon mirror scanner or the like employed in a device such as a laser beam printer.

2. Description of the Prior Art:

In a dynamic pressure-type fluid bearing, a sleeve and a journal are kept out of contact by a fluid film during rotation. Such a bearing is described in the magazine of the Nihon Kikai Gakkai, published in July, 1986, in an article entitled "Newly-developed Air Bearings and their Application to Business Machines" by T. Tanaka. According to this article, it is reported that good results are obtained by applying the fluid bearing to a laser scanner employed in a laser printer.

A basic fluid bearing applied to a laser scanner will now be described with reference to FIGS. 7 and 8. In a dynamic pressure-type fluid bearing using a sleeve and a journal, either the sleeve or the journal may be rotated. In the example of the conventional fluid bearing arrangement described with reference to FIGS. 7 and 8, it will be assumed that the sleeve is rotated.

Figure 7:
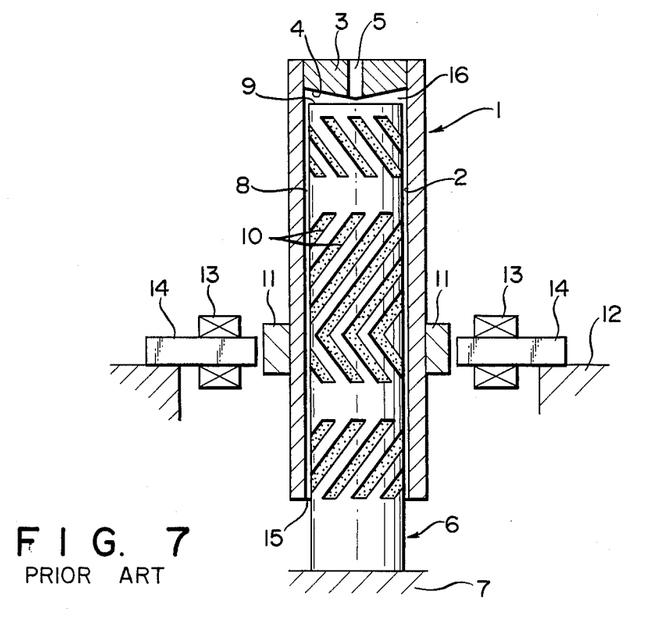
FIG. 7 is a front view, portions of which are shown in section, illustrating an example of the prior art.

In FIG. 7, a sleeve 1 rotated at high speed has a radial inner peripheral surface 2. A thrust bearing member 3 having a thrust bottom face 4 is fixedly secured to one end portion of the sleeve 1 and is provided through its center with a passageway 5 for the passage of a gas. The journal 6, which is for axially supporting the sleeve 1, is supported by suitable stationary means 7. The journal 6 includes a radial outer peripheral surface 8 cooperating with the radial inner peripheral surface 2, and a thrust end face 9 cooperating with the thrust bottom face 4. The radial outer peripheral surface 8 is formed to include grooves 10 for producing dynamic pressure.

A magnet 11 is fixedly secured to the outer periphery of the sleeve 1 and opposes plural sets of drive coils 13 and yokes 14 attached to suitable stationary means 12. The lower end of sleeve 1 as seen in the Figure is formed to include an inlet 15 for inflow of a gas, and a pocket (pressure chamber) 16 of very small volume is formed between the thrust bottom face 4 and the thrust end face 9.

In the above arrangement, the thrust bottom face 4 and the thrust end face 9 are in contact when the bearing is at rest, namely when the sleeve 1 is not rotating. When the coils 13 are selectively energized to rotate the sleeve 1, a gas which flows in from the inlet 15 is guided upwardly in the Figure through a small clearance of micron order, which is formed between the radial inner peripheral surface 2 and radial outer peripheral surface 8, in a well-known manner due to the action of the grooves 10. The sleeve 1 is caused to float by several microns due to the pressure of the gas. When the sleeve 1 floats in this fashion, the gas in the pressurized pocket 16 is brought into communication with the outside via the passageway 5. Thus, the gas in pocket 16 is capable of flowing out from the passageway 5, so that the pressure in pocket 16 is self-adjusted in such a manner that balance is maintained among the dead load of the rotational system including sleeve 1, the magnetic attracting force acting upon the rotational system, and the external air pressure acting upon the system. Thus, the sleeve 1 continues rotating at high speed in the levitated state as is well-known in the art.

Figure 8:
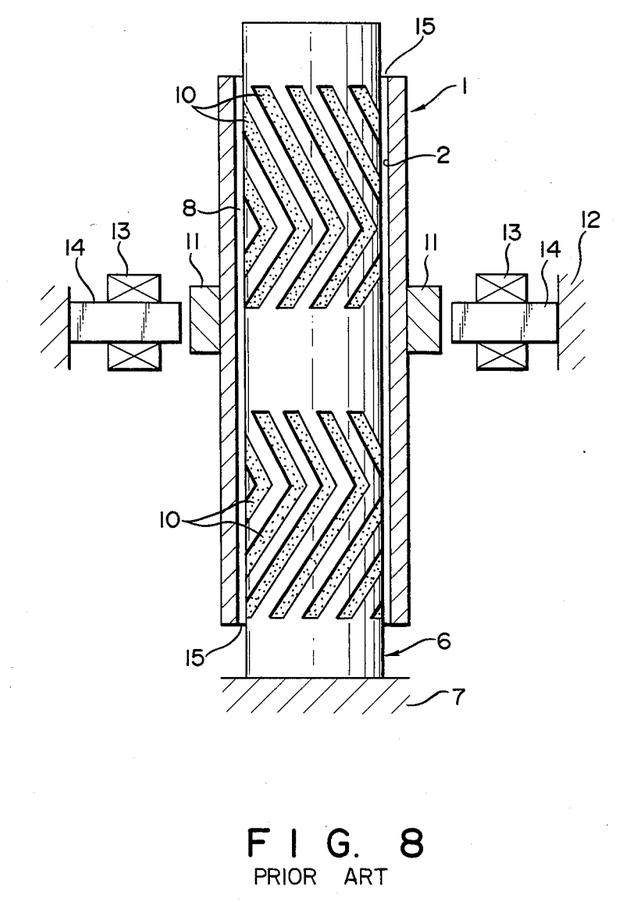
FIG. 8 is a front view, portions of which are shown in section, illustrating another example of the prior art.

FIG. 8 illustrates another conventional arrangement, in which portions similar to those shown in FIG. 7 are designated by like reference characters. In this arrangement, as will be apparent from FIG. 8, there are no thrust bearing faces, so that the rotational sleeve 1 is maintained in the levitated state by the magnetic attracting force even when the system is at rest. When the sleeve 1 rotates, a gas flows in from upper and lower inlets 15 as described above due to the action of the grooves 10. Owing to the presence of a thin film of air between the radial inner peripheral surface 2 and radial outer peripheral surface 8 (as a result of which a dynamic pressure-type radial bearing is produced), the sleeve 1 continues rotating at high speed while the contactless state is assured with respect to the journal 6.

In the above-described arrangement of FIG. 7, the gas discharged from the passageway 5 acts so as to maintain the pressure in pocket 16 in a suitable state. Owing to a so-called "orifice effect" produced by the passageway 5, the pressure regulating mechanism is important in terms of regulating a pressure variation within the pocket 16 and has a close relation to a centering effect. Accordingly, the passageway 5 is required to have a very high dimensional precision and positional accuracy. However, machining such a small passageway to satisfy these requirements involves considerable difficulty.

Furthermore, since the periphery of the passageway 5 and the thrust end face 9 repeatedly come into contact whenever the bearing is started and stopped, the rim of the passageway 5 tends to be damaged by friction, as a result of which the reliability and precision of the bearing suffer. If it is attempted to form the thrust bearing member 3 of a wear-resistant material having a high hardness in order to deal with this friction-induced damage, machining of the passageway 5 becomes all the more difficult.

In the conventional arrangement of FIG. 8, on the other hand, the foregoing problems do not arise because there are no thrust bearing surfaces. Also, since the travelling distance of the gas which flows in from the inlets 15 is less than in the arrangement of FIG. 7, the grooves 10 for producing dynamic pressure are easier to design and there is comparatively little risk of a deterioration in characteristics due to frictional loss of the gas.

However, since there is no thrust dynamic pressure bearing effect, the force from magnet 11 for holding the sleeve 1 in the magnetically levitated state becomes unbalanced due to ripple in the current passed through the coils 13. As a result, the sleeve 1 (the rotational system) tends to undergo minute oscillation up and down.

SUMMARY OF THE INVENTION

Accordingly, an object of the present invention is to provide a fluid bearing which solves the aforementioned problems encountered in the prior art.

Another object of the present invention is to provide a dynamic pressure-type fluid bearing adapted so that a fluid is introduced into a very small clearance between a radial outer peripheral surface and a radial inner peripheral surface from the direction of a sleeve end face, wherein the bearing has a rotational system that is free of up-and-down oscillation and possesses a fluid pressure self-adjusting mechanism, the bearing being constructed of simply formed parts having a fluid pressure adjusting effect.

According to the present invention, the foregoing objects are attained by providing a fluid bearing comprising: a sleeve having a radial inner peripheral surface and a thrust bottom face; and a journal having a radial outer peripheral surface cooperating with the radial inner peripheral surface, and a thrust end face cooperating with the thrust bottom face; one of the sleeve and the journal being stationary and the other being rotatable so that relative rotation is capable between them across a predetermined clearance; the sleeve or the journal, whichever is rotatable, being held by a magnetic retaining force in such a manner that a predetermined gap is formed between the thrust bottom face and the thrust end face even when the bearing is at rest; one of the thrust bottom face and the thrust end face including a porous body formed of a fluid-permeable porous material so that all or at least a portion of the thrust bottom face or the thrust end face is capable of being communicated with the outside.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the drawings.

Figure 1:
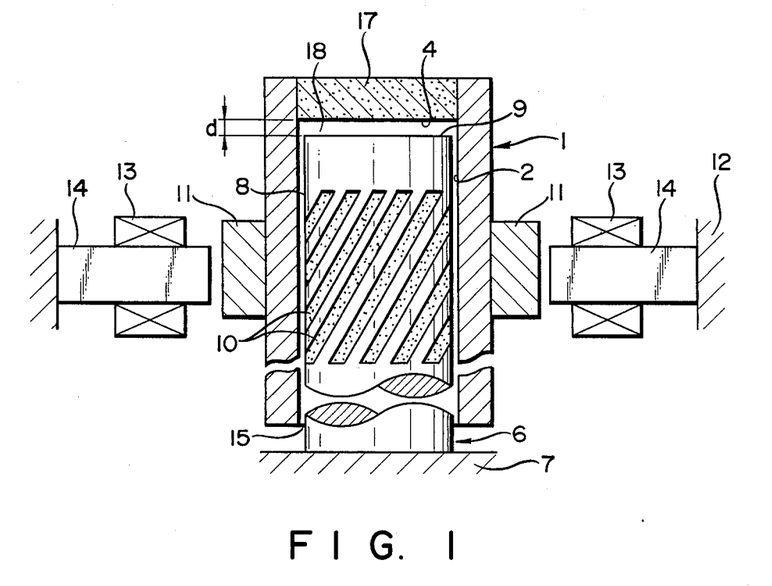
FIG. 1 is a fragmentary front view, portions of which are shown in section, illustrating a first embodiment of a fluid bearing according to the present invention.

FIG. 1 is a fragmentary front view, portions of which are shown in section, illustrating a first embodiment of a fluid bearing according to the present invention. Portions in FIG. 1 and in FIGS. 2 through 6 described later that are similar to portions in the prior-art arrangements set forth above are designated by like reference characters and need not be described again.

In FIG. 1, a disk-shaped porous body 17 is securely fitted into one end of the aforementioned sleeve 1 and has the thrust bottom face 4. The porous body 17 is made by sintering a powder, thus providing a proper amount of gas permeability. Examples of such a powder material are stainless steel, ceramics and the like. In the present embodiment, the powder material used is a so-called sintered body coated with a tin film. The porous body 17 is reported in the Research Report, Vol. 38, No. 11 of the Denshi Gijitsu Sogo Kenkyujo, published in November of 1974, in an article entitled "Study on Externally Pressurized Porous Gas Bearings, 1. Static Performance of Externally Pressurized Porous Thrust Gas Bearings", by M. Okano and S. Togo.

Figure 9:
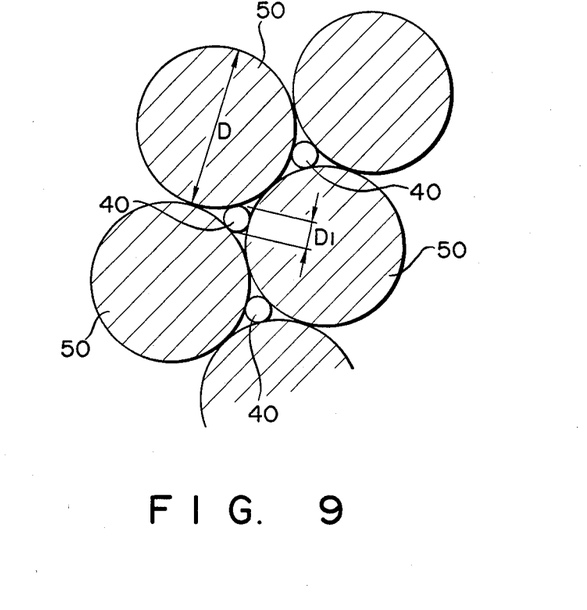
FIG. 9 is an explanatory view illustrating the calcined state of a porous body according to the present invention.

According to this report, the spherical raw material consists of nearly true spheres 50, shown in FIG. 9. As a result of calcining the raw material in a state where three of the true spheres 50 are in contact, orifices 40 are formed, as shown in FIG. 9.

Letting the diameter of the true spheres 50 be represented by D, the diameter $D_1$ of the orifices is decided as indicated by the following equation:

$$D_1 = (\sec \pi/6 - 1)D$$

Figure 10:
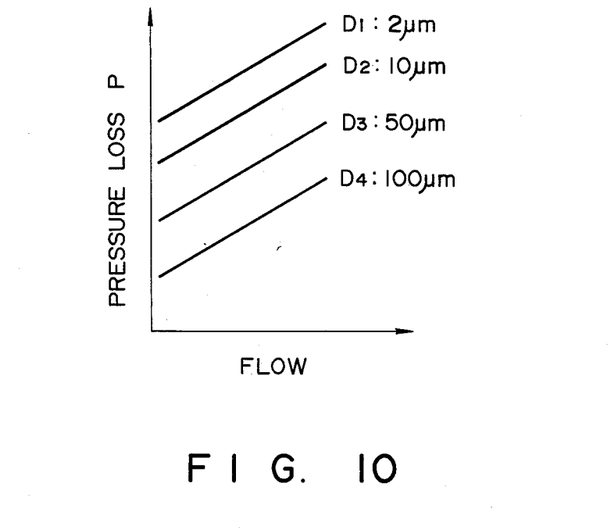
FIG. 10 is a view illustrating the relationship among the particle diameter of a porous body according to the present invention, flow rate and pressure loss.

The article also states that the orifices 40 were confirmed to be formed over the entirety of the calcined porous body such as the porous body 17 shown in FIG. 1. The relationship between the diameter D of the true spheres 50 and the fluid flow-through resistance (pressure loss P) is as shown in FIG. 10, which demonstrates that the smaller the true sphere diameter D, the larger the pressure loss P. $D_1$ of 2 $\mu$m is obtained when D of 55 $\mu$m is chosen. D ranges from 50 $\mu$m to 300 $\mu$m. It is also reported that it is possible for the porous body to be machined.

Porous bodies of the above kind are presently being marketed by SMC K.K. in the form of sintered metal elements having various shapes, dimensions and specifications for a variety of applications.

The permeability or pressure loss P of the porous body 17 can be decided not only by the particle diameter of the raw material but also by the thickness and area of the porous body 17. It is also very easy to fabricate the porous body.

The sleeve 1, even when at rest, is levitated a predetermined amount with respect to the journal 6 by the magnetic attracting force between the magnet 11 and the yoke 14. Accordingly, the positional relationship between the magnet 11 and the yoke 14 in the height direction is set precisely. Owing to the floating of the sleeve 1, a gap 18 is formed between the thrust bottom face 4 and thrust end face 9 to separate these end faces from each other by a predetermined distance d even when the sleeve is at rest.

The predetermined distance d is preferably within a range of 0.5-3.0 mm. As a result, the gap 18 allows a gas layer of a predetermined thickness to form between the thrust bottom face 4 and the thrust end face 9. The thickness of this gas layer is three or four figures larger than the clearance of several microns between the radial inner peripheral surface 2 and radial outer circumferential surface 8 or three or four figures larger than the several microns of lift of the sleeve 1 at rotation thereof in the conventional arrangement shown in FIG. 7.

In the arrangement of FIG. 1, selectively energizing the coils 13 rotates the sleeve 1, whereupon a gas which has flown in from the inlet 15 is guided upwardly through a small clearance of several microns between the radial inner peripheral surface 2 and radial outer peripheral surface 8 due to the action of the grooves 10. As a result, the gas is pumped up to the gap 18 and compressed therein. Experiments have shown that this causes the sleeve 1 to lift by approximately one additional micron in comparison with the at-rest state. Since the porous body 17 allows gentle passage of the gas therethrough, namely a gradually loss in pressure, owing to its gas permeability, an orifice effect is produced in which the pressure within the gap 18 is held constant, thus allowing the sleeve 1 to continue rotating at high speed without any fluctuation up or down.

It has been experimentally verified that the compressed gas layer of a predetermined thickness in gap 18 during rotation of the sleeve 1 exhibits a resisting force which greatly suppresses up-and-down fluctuation of the sleeve 1 even when the bearing is subjected to vibration and impact. The reason for this is two-fold, namely the fact that the thickness of the gas layer is several figures larger than the amount of lift of sleeve 1 due to effects of dynamic pressure, and the fact that the porous body 17 permits gentle passage of the gas therethrough.

More specifically, the aforementioned bronze sintered body was used as the porous body 17 of FIG. 1. Particles of the powder having a particle diameter of 55 μm were sintered to form a disk having a diameter of 10 mm and a thickness of 6 mm. The dimension d of the gap 18 was set to 1 mm. Upon subjecting the fluid bearing to an external impact force of 1 G, it was found that the amplitude of sleeve oscillation was less than 0.005 mm.

By contrast, when an impact force of 1G was applied to the conventional fluid bearing of FIG. 7, in which the sleeve 1 was given 1 mm of lift in the at-rest state, the maximum amplitude of sleeve oscillation was 0.5 mm.

Figure 2:
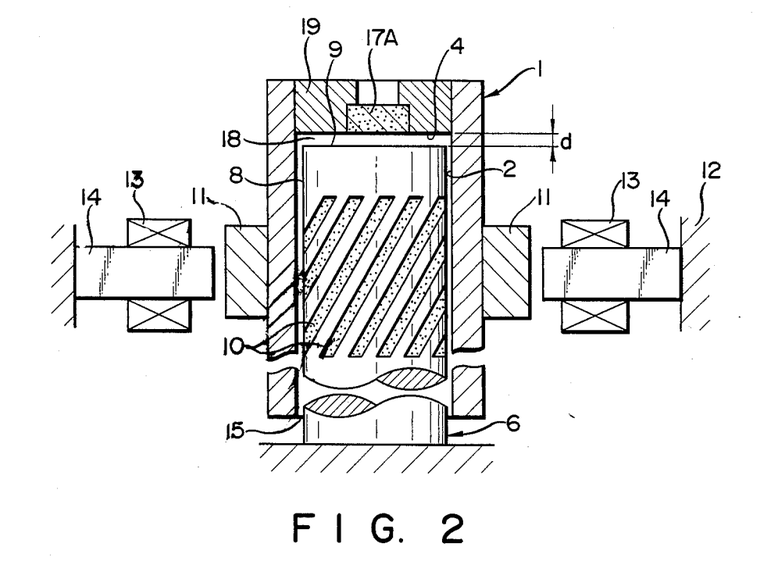
FIG. 2 is a fragmentary front view, portions of which are shown in section, illustrating a second embodiment of a fluid bearing according to the present invention.

FIG. 2 illustrates a second embodiment of the present invention, in which a porous body 17A is fixedly secured in only a portion of the end of sleeve 1 via a support member 19. The effects of this embodiment are the same as those of the first embodiment.

Figure 3:
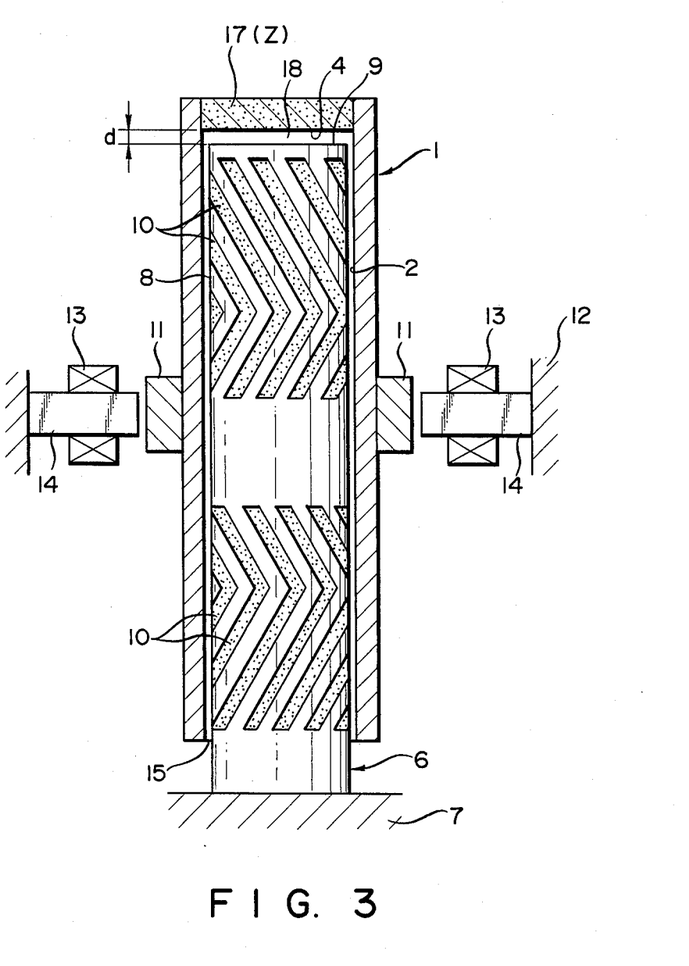
FIG. 3 is a fragmentary front view, portions of which are shown in section, illustrating a third embodiment of a fluid bearing according to the present invention.

FIG. 3 is a sectional front view showing a third embodiment of the present invention. Here the grooves 10 in the journal 6 that are for producing dynamic pressure have a herring-bone configuration similar to that of the prior-art example shown in FIG. 8. The grooves 10 are formed to have vertical symmetry and are arranged in such a manner that a gas will be introduced from both end faces of the sleeve 1 into a small clearance of several microns between the radial inner peripheral surface 2 and the radial outer peripheral surface 8. A suitable gas permeable porous body 17 (Z) having a thrust bottom face 4 is fixedly secured to the upper end of sleeve 1 as shown in the figure.

In the present embodiment, the entirety of the thrust bottom face 4 is constituted by a disk-shaped porous body. It is permissible to form the porous body solely in the central portion of the thrust bottom face 4 or solely in the circumferential portion thereof.

A powder material exhibiting a suitable gas permeability is selected as the powder material Z. Examples are a bronze, stainless steel, ceramics. In the present embodiment, the powder material used is a so-called bronze body coated with a tin film. The result is a slowly gas-permeable sintered metal element which can be regarded as an assemblage of capillary tubes in which bronze bodies are joined together. The degree of gas permeability is decided by the particle diameter of the powder material. The bronze sintered bodies can be fabricated very easily.

The sleeve 1, even when at rest, is levitated a predetermined amount d with respect to the journal 6 by the magnetic attracting force between the magnet 11 and the yoke 14. Accordingly, the positional relationship between the magnet 11 and the yoke 14 in the height direction is set precisely. Owing to the floating of the sleeve 1, the gap 18 is formed between the thrust bottom face 4 and thrust end face 9 to separate these end faces from each other by the predetermined distance d even when the sleeve is at rest. The predetermined distance d is decided by the size of the fluid bearing used and has a value which will assure that the thrust bottom face 4 and thrust end face 9 will not contact each other even if the gas in gap 18 flows violently into the small clearance between the radial inner and outer peripheral surfaces 2, 8 in a transient manner at the time of a starting operation, described below.

By way of example, if the diameter of the journal 6 is 16 mm, the value of d would be in the range of 1.0–1.5 mm. In other words, d is set to be four orders of magnitude larger than the small clearance of several microns between the radial inner and outer peripheral surfaces 2, 8.

In the arrangement of FIG. 3, selectively energizing the coils 13 rotates the sleeve 1, whereupon a gas flows into the small clearance between the radial inner peripheral surface 2 and radial outer peripheral surface 8 from the inlet 15 at the lower end of the sleeve in FIG. 3 due to the action of the grooves 10. Similarly, the gas in the gap 18 at the upper end of the sleeve 1 in FIG. 3 flows into the clearance between the radial inner and outer peripheral surfaces 2, 8. As a result, a dynamic pressure-type radial bearing is formed due to the thin air films between the surfaces 2, 8.

Since the suitable gas-permeable porous body 17 is located at the upper end of the sleeve 1, the outside air flows into the gap 18 before the thrust portions make contact, thus supplementing the effect of the pressure within the gap 18. Owing to the pressure regulating mechanism produced by the orifice effect of the porous body, the pressure within the gap 18 becomes constant at a predetermined time after the bearing is started. The rotational system constituted by the sleeve 1 therefore continues rotating stably at high speed without fluctuating up and down. As a result, the rotational system will not oscillate up and down even if there are small variations in the drive current. Moreover, friction-induced damage to the thrust bearing surfaces, which could not be avoided with the conventional arrangement of FIG. 7, does not occur when the bearing is started and stopped.

Figure 4:
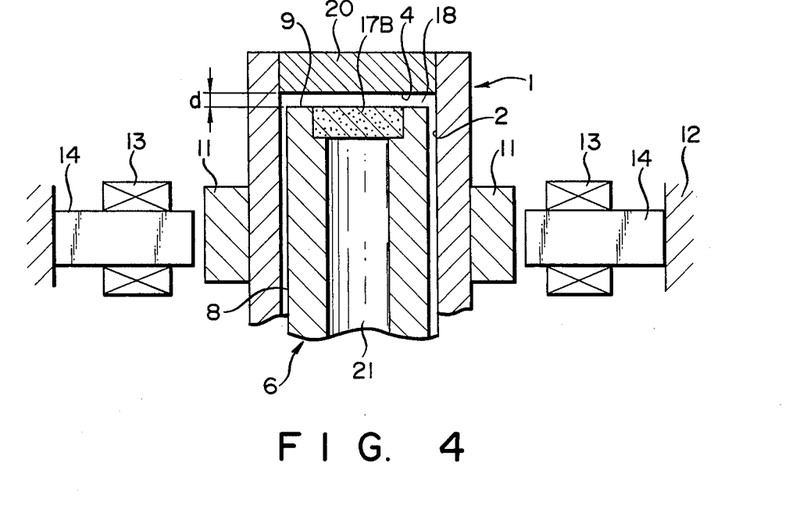
FIG. 4 is a fragmentary front view, portions of which are shown in section, illustrating a fourth embodiment of a fluid bearing according to the present invention.

FIG. 4 illustrates a fourth embodiment of the present invention, in which the end portion of the sleeve 1 is closed by a suitable sealing member 20, the journal 6 is formed to include a hollow portion 21 (which communicates with the outside), and a porous body 17B is fixedly secured in the end portion of the journal 6 to provide slow gas permeability between the hollow portion 21 and the gap 18. When the sleeve 1 rotates, the gas within the gap 18 is capable of being discharged into the hollow portion 21, namely to the outside, through the porous material 17B. The effects of this embodiment are the same as those of the first embodiment.

Figure 5:
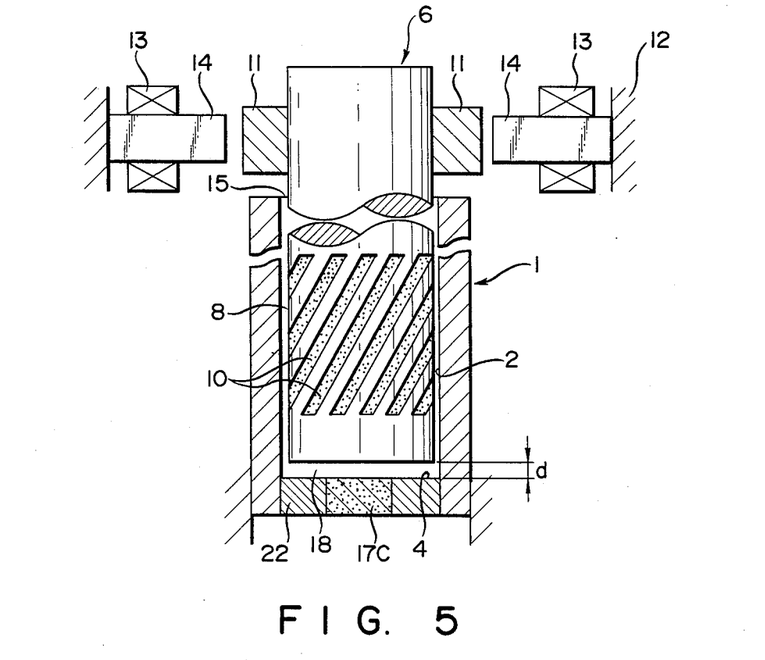
FIG. 5 is a fragmentary front view, portions of which are shown in section, illustrating a fifth embodiment of a fluid bearing according to the present invention.

FIG. 5 shows a fifth embodiment of the present invention, in which the sleeve 1 is stationary, the journal 6 is rotatable, and the journal 6 is caused to float, even when at rest, by the magnetic attracting force. When the journal 6 is rotated, the gas drawn into the gap 18 is slowly discharged from a porous body 17C fixedly secured in the end portion of the sleeve 1 via a support member 22. As a result, the interior of the gap 18 is held at a constant pressure. The effects of this embodiment are the same as those of the first embodiment.

Figure 6:
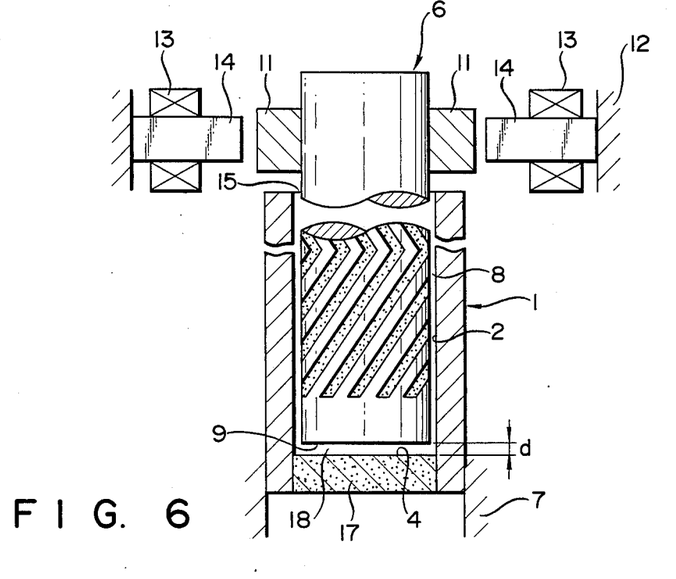
FIG. 6 is a fragmentary front view, portions of which are shown in section, illustrating a sixth embodiment of a fluid bearing according to the present invention.

FIG. 6 shows a sixth embodiment of the present invention, in which the sleeve 1 is stationary, the journal 6 is rotatable, and the journal 6 is caused to float, even when at rest, by the magnetic attracting force, thereby forming the gap 18. The effects of this embodiment are the same as those of the first embodiment.

Figure 11:
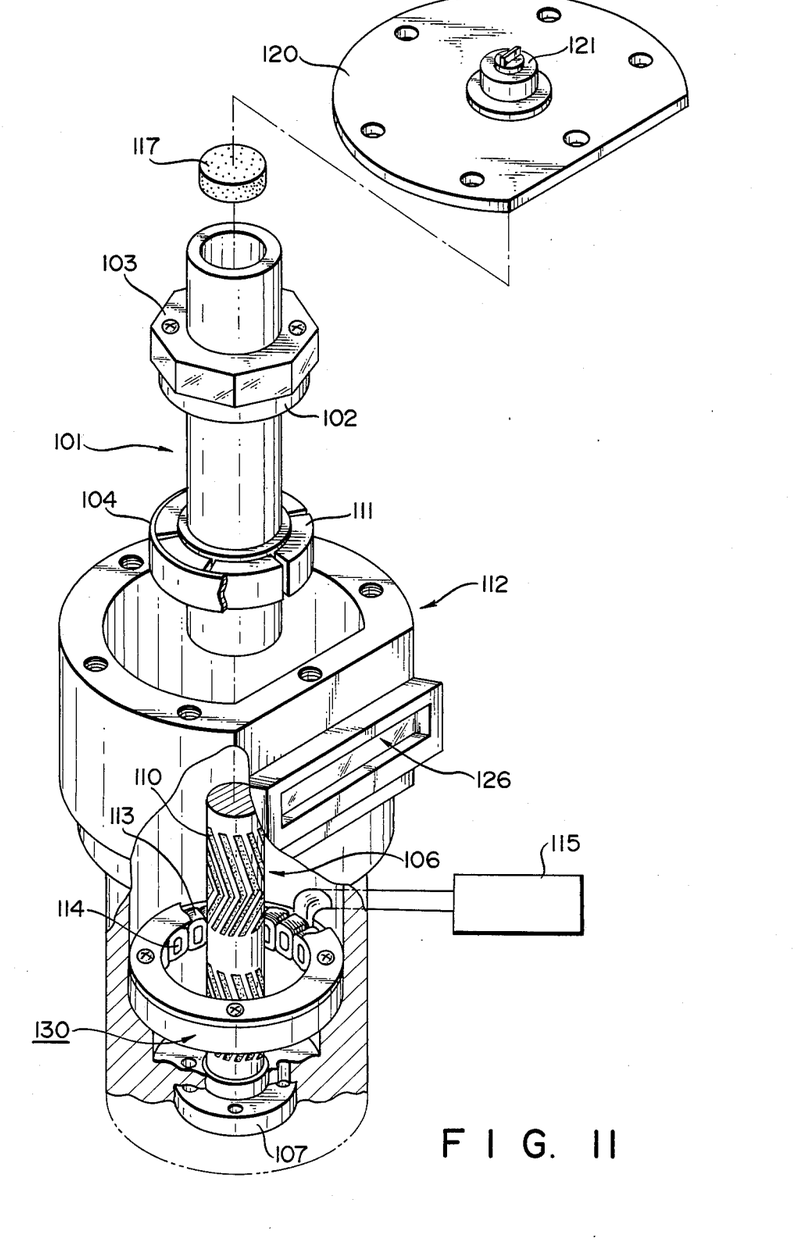
FIG. 11 is an exploded perspective view illustrating an example of application of a fluid bearing according to the present invention.

FIG. 11 illustrates an example in which the above-described fluid bearing is applied to a laser scanner. As shown in FIG. 11, a housing 112 comprises a cylinder which is open at its upper end and closed at its lower end. The lower end of housing 112 is machined to have a step portion after the housing is subjected to drilling work. A journal 106 provided with grooves 110 for producing dynamic pressure is inserted into the housing 112, after which the journal is arranged to depend from the lower face of the housing.

An electromagnet assembly 130 is provided at a prescribed location in the lower portion of the housing 112 and is electrically connected to a selective energizing circuit 115. The electromagnet assembly 130 includes a total of 18 circumferentially arranged small electromagnet assemblies or stators each constructed in such a manner that a coil 113 is inserted into a respective yoke 114. A revolving magnetic field is produced in the electromagnet assembly 130 when the small electromagnet assemblies are energized by the selective energizing circuit 115.

The housing 112 is provided with a glass window 126 for input and output of a laser beam. A laser beam after being reflected by a polygon mirror 103, described below, is outputted upon passing through the glass window 126.

A sleeve 101 comprises a cylinder having an inner diameter several microns larger than the outer diameter of the journal 106 and is provided at its upper portion with a flange 102 on which the polygon mirror 103 is mounted. A total of six permanent magnets 111 are provided on the lower portion of the sleeve 101 circumferentially thereof. These magnets are fixed at prescribed positions by a ring 104. The outer diameter of the ring 104 is less than the diameter of an inner circumferential surface formed by the 18 stators 114 of the electromagnet assembly 130. A porous body 117 is fixedly secured to the upper portion of the sleeve 101.

The sleeve 101 thus assembled is fitted over the journal 106. The permanent magnets 111 of the sleeve 101 are attracted to the stators 114 so that the bottom face of the porous body 117 will not contact the upper end face of the journal 106. As a result, a prescribed gap is maintained between the bottom face of the porous body 117 and the upper end face of the journal 106.

Finally, a cover 120 is attached to the upper end of housing 112 by screws. An axial securing body 121 is provided on the central portion of the cover 120. When the sleeve 101 is urged thereby, the latter will not be damaged if subjected to impact during transport. The arrangement is such that the axial securing body 121 is made to free the sleeve 101 when the apparatus is used.

The present invention can be modified in various ways without departing from the scope of the claims. For example, the grooves for producing dynamic pressure can be provided on the radial inner peripheral surface of the sleeve 101 rather than on the journal.

Some advantages which stem from use of a fluid bearing according to the present invention are as follows:

(1) A predetermined gap of e.g. 0.5–3.0 mm is formed between the thrust bottom face and thrust end face even when the bearing is at rest. As a result, the thrust bottom face and thrust end face do not sustain friction-induced damage when the bearing is started and stopped.

(2) A gas swept into the gap between the thrust bottom face and thrust end face through the radial inner peripheral surface and radial outer peripheral surface at rotation is slowly discharged through the porous material. Owing to the internal pressure self-regulation action produced by the orifice effect of the porous body, stable high-speed rotation without vertical fluctuation is assured.

(3) A gas swept into the gap between the thrust bottom face and thrust end face becomes a compressed gas layer the thickness of which is several orders of magnitude larger than the small clearance in the radial direction. The presence of this gas layer and the fact that the gas is slowly discharged by the porous body serve to suppress up-and-down vibration of the rotational system when an impact is received.

(4) The sleeve or the journal, whichever is rotatable, is held by a magnetic retaining force in such a manner that a predetermined gap is formed between the thrust bottom face and thrust end face even when the bearing is at rest. When the predetermined gap is brought into gradual communication with the outside by the porous body, the pressure in the gap between the thrust bottom face and the thrust end face is held constant at all times by the porous body during high-speed rotation of the rotational system. As a result, stable, high-speed rotation of the rotational system without vertical fluctuation is assured.

(5) If a predetermined gap of e.g. 1.0–1.5 mm, in a case where the diameter of the journal is 16 mm, is formed between the thrust bottom face and thrust end face even when the bearing is at rest, the thrust bottom face and thrust end face will not contact each other when a gas inside the predetermined gap flows into the small clearance of several microns between the radial inner and outer peripheral surfaces at the start of bearing operation. As a result, there is absolutely no danger of friction-induced damage when the bearing is started and stopped.

(6) The porous body can be readily formed by sintering powder material, which can be regarded as an assemblage of a multiplicity of capillary tubes. The gas permeability of the porous body can be freely controlled by regulating the particle diameter of the sintered metal particles, the thickness of the element and the area thereof.

What is claimed is:

1. A fluid bearing comprising:
    a sleeve having a radial inner peripheral surface and an end portion with a thrust bottom face; and
    a journal having a radial outer peripheral surface opposing said radial inner peripheral surface of the sleeve, and an end portion with a thrust end face opposing said thrust bottom face;

one of said sleeve and said journal being mounted to rotate relative to the other with a predetermined clearance between said radial outer peripheral surface and said inner peripheral surface;

a magnetic retaining force means for magnetically supporting said rotatable one of the sleeve and the journal forming a predetermined gap between said thrust bottom face of the sleeve and said thrust end face of the journal;

said end portion of one of the sleeve and the journal including a porous body having fluid permeability characteristics effective to discharge gas from the predetermined gap between said thrust bottom face and said thrust end face at a rate effective for preventing fluctuations between the sleeve and the journal during relative rotation.

2. The fluid bearing according to claim 1, wherein the magnetic retaining force means includes a permanent magnet disposed along an outer circumferential surface of said sleeve, and means for generating a revolving magnetic field including a stator arranged to surround said permanent magnet across a second predetermined clearance for attracting said permanent magnet to said stator by magnetic force; and the predetermined gap between said thrust bottom face and said thrust end face is not less than approximately 0.5 mm when there is no relative rotation between the sleeve and journal.

3. The fluid bearing according to claim 1, wherein said sleeve is rotatable and the predetermined clearance between said radial inner peripheral surface and said outer peripheral surface defines an inlet for a fluid adjacent an end portion of said journal opposite said thrust end face.

4. The fluid bearing according to claim 3, wherein the end portion of said sleeve is said porous body.

5. The fluid bearing according to claim 3, wherein the end portion of said sleeve is defined by a peripheral boundary and said porous body is disposed centrally in said end portion radially spaced from the peripheral boundary.

6. The fluid bearing according to claim 3, wherein said journal includes a hollow portion communicating with the end portion thereof, the end portion of said sleeve is closed, and the end portion of said journal includes said porous body.

7. The fluid bearing according to claim 1, wherein said journal is rotatable and the predetermined clearance between said radial inner peripheral surface and said outer peripheral surface defines an inlet for a fluid adjacent an end portion of said journal opposite said thrust end face.

8. The fluid bearing according to claim 7, wherein the end portion of said sleeve includes said porous body.

9. The fluid bearing according to claim 1, wherein the radial outer peripheral surface includes a groove therein for producing dynamic pressure effective to introduce a fluid into the predetermined clearance between said radial inner peripheral surface and said radial outer peripheral surface.

10. The fluid bearing according to claim 9, wherein said sleeve is rotatable and the end portion of said sleeve includes said porous body.

11. The fluid bearing according to claim 9, wherein said sleeve is rotatable, said journal includes a hollow portion communicating with the end portion thereof, the end portion of said sleeve is closed, and the end portion of said journal includes said porous body.

12. The fluid bearing according to claim 9, wherein said journal is rotatable and the end portion of said sleeve includes said porous body.

13. The fluid bearing according to claim 1, wherein said porous body is sintered bronze.

14. The fluid bearing according to claim 1, wherein said porous body is sintered stainless steel.

15. The fluid bearing according to claim 1, wherein said porous body is ceramic.

* * * * *